United States Patent [19]

Akiyama et al.

[11] Patent Number: 5,395,865
[45] Date of Patent: Mar. 7, 1995

[54] UNSATURATED POLYESTER COMPOSITIONS, MOLDING MATERIALS AND MOLDED PRODUCTS

[75] Inventors: Koichi Akiyama; Takashi Shibata; Hiroma Miyashita, all of Kanagawa; Sanji Aoki, Nara; Ken Hatta, Aichi; Takashi Ino, Aichi; Yasuhiro Mishima, Aichi, all of Japan

[73] Assignee: Takeda Chemical Industries, Ltd., Osaka, Japan

[21] Appl. No.: 973,056

[22] Filed: Nov. 6, 1992

[30] Foreign Application Priority Data

Nov. 9, 1991 [JP] Japan .................. 3-321113

[51] Int. Cl.6 ............................................. C08L 67/06
[52] U.S. Cl. ...................................... 523/510; 523/511; 523/522; 523/523; 525/27; 525/44
[58] Field of Search .................. 523/510, 511; 525/27

[56] References Cited

U.S. PATENT DOCUMENTS

| | | | |
|---|---|---|---|
| 3,227,665 | 1/1966 | Fourcade | 523/510 |
| 3,288,735 | 11/1966 | Watanabe | 264/121 |
| 5,077,326 | 12/1991 | Shibata et al. | 523/523 |
| 5,202,366 | 4/1993 | Reid | 525/44 |

Primary Examiner—Patricia A. Short
Attorney, Agent, or Firm—Heller, Ehrman, White & McAuliffe

[57] ABSTRACT

Quickly curable unsaturated polyester composition with improved surface characteristics and stability in storage contains 20–40 weight parts of unsaturated polyester, 20–60 weight parts of vinyl monomer, 0.01–1.0 weight parts of BHT (ditertiary butyl hydroxy toluene), and 10–40 weight parts of thermoplastic resin such that the total is 100 weight parts. In addition, 0.001–0.1 weight parts of compound with effect of inhibiting polymerization at temperatures over 100° C. are contained against the total of 100 weight parts. Molding materials are obtained by impregnating glass fibers with such compositions and products are obtained by curing such molding materials.

7 Claims, 1 Drawing Sheet

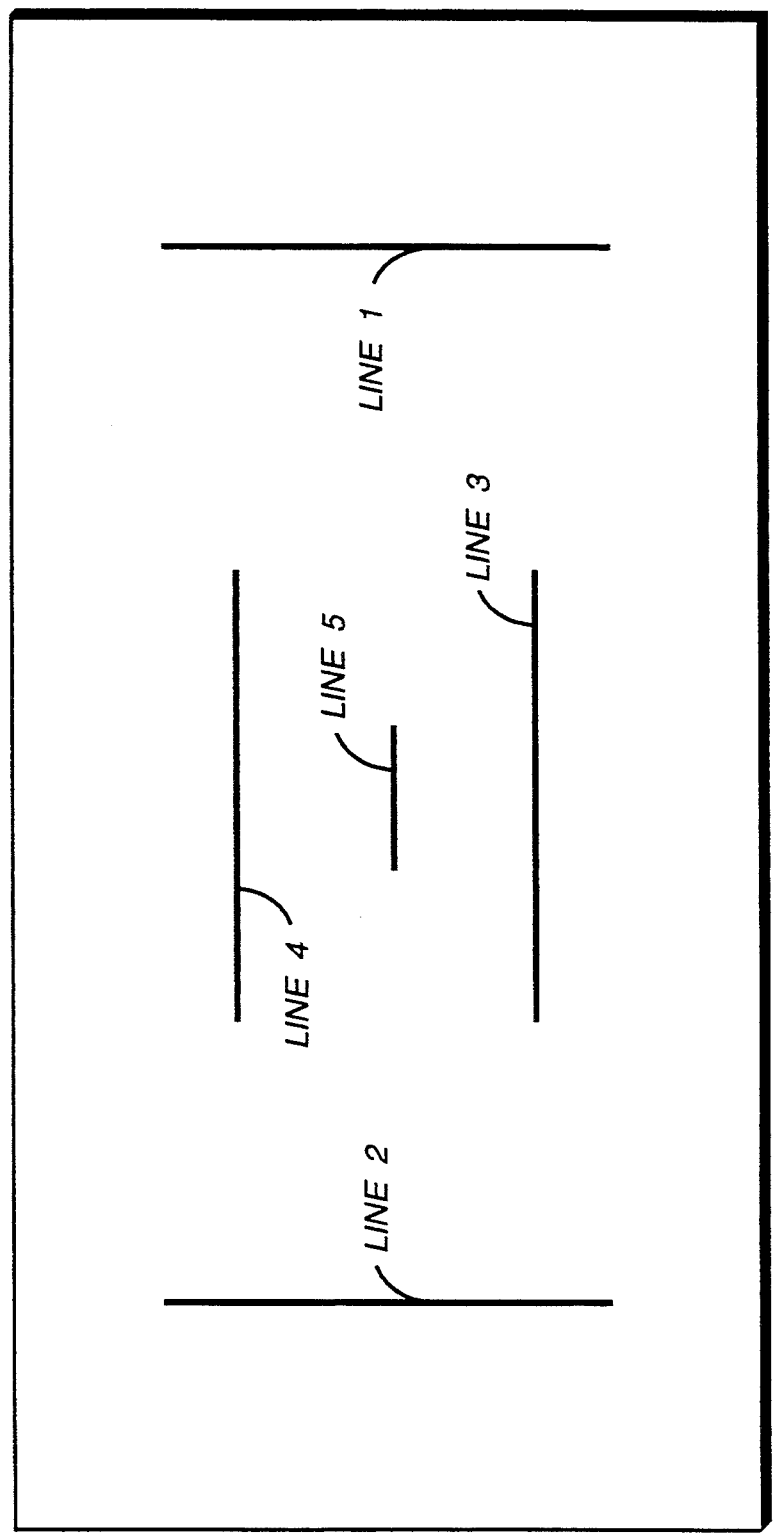

1

UNSATURATED POLYESTER COMPOSITIONS, MOLDING MATERIALS AND MOLDED PRODUCTS

BACKGROUND OF THE INVENTION

This invention relates to quickly curable unsaturated polyester compositions capable of providing superior surface quality, superior in stability in storage, and hence useful as automotive exterior body panels and other exterior parts. This invention also relates to sheet-like and bulk-like molding compounds obtained by impregnating such unsaturated polyester compositions in glass fibers, and molded products obtained by curing such molding materials.

Fiber-reinforced plastics (FRP) based on unsaturated polyester resins have superior characteristics not only regarding mechanical strength and resistance against heat, water and chemicals but also regarding productivity, and are being used extensively in bathtubs, water tank panels and bathroom sinks. Recently, unsaturated polyester sheet molding compounds (SMC) and bulk molding compounds (BMC) have come to be recognized as plastic materials for automotive exterior body panels and are being applied not only to main exterior panels such as engine hoods, roofs and trunk lids, but also to other exterior parts such as spoilers, air intakes and rocker panels.

The SMC and BMC to be used for automotive exterior body panels are required in particular to have superior surface quality, fast curing property and high productivity. If the curing speed of SMC and BMC can be improved even by seconds, for example, this alone can improve productivity significantly. For this reason, there have been various proposals for quick curing catalysts. (See, for example, U.S. Pat. No. 4,278,558.) If the curability of SMC or BMC is increased, however, its surface smoothness and stability in storage are generally adversely affected. It has been known to use thermoplastic resin such as polymethyl methacrylate, polyvinyl acetate and styrene butadiene block copolymers as a low profile additive, and it has been reported that the surface smoothness can be improved, when the curing speed has been increased, by using alkane polyol polyacrylate or alkane polyol polymethacrylate (Japanese Patent Publication Tokkai 01-315458). Stability in storage, on the other hand, is significantly affected if the curing speed is increased. Stability in storage may be improved if a large amount of polymerization inhibitor such as PBQ (parabenzoquinone) is added, but the start of curing reaction is significantly delayed, and not only is the purpose of improving the curing speed defeated, but the surface smoothness is also significantly affected. In summary, it has been a serious problem to secure stability in storage in the development of molding materials having both quick curing property and superior surface quality.

SUMMARY OF THE INVENTION

The problem to be solved by the present invention is that molding materials be provided with superior surface quality, quick curing property and superior stability in storage. Molding materials according to the present invention, with which the above and other objects can be satisfied, may be characterized as comprising an unsaturated polyester composition comprising unsaturated polyester, vinyl monomer, ditertiary butyl hydroxy toluene, thermoplastic resin, at least one kind of organic peroxide serving as reaction initiator and a compound with property of inhibiting polymerization at temperatures over 100° C.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings FIG. 1 is a plan view to show a molded product according to the present invention.

DETAILED DESCRIPTION OF THE INVENTION

The present invention relates to (1) unsaturated polyester compositions comprising unsaturated polyester, vinyl monomer, BHT (ditertiary butyl hydroxy toluene), thermoplastic resin, at least one kind of organic peroxide serving as reaction initiator, and a compound with property of inhibiting polymerization at temperatures over 100° C.; (2) a molding material obtained by impregnating such an unsaturated polyester in glass fibers; and (3) a molded product obtained by curing such a molding material.

The aforementioned unsaturated polyester compositions (1) have not only superior mechanical strength and resistance against heat, water and chemicals but also characteristics required to be applicable to automotive exterior body panels such as superior surface quality (surface smoothness and paintability), quick curing capability (productivity), and superior stability in storage. The sheet and bulk molding compositions (2), obtained by impregnating 100 weight parts of such an unsaturated polyester composition together with 100–250 weight parts of a filler (such as calcium carbonate) in glass fibers (for example, of ½–4 inches in length) such that the glass fibers will be 10–40 weight % of the entire composition, are useful as molding materials for exterior body panels and other external parts. Moreover, these molding materials have fast curing capability and can yield products with extremely superior stability in storage and surface smoothness (with very little bumpiness and waviness at ribs and embossed areas).

The unsaturated polyesters, which are to be used according to the present invention, are of a kind hitherto commonly used and can be synthesized by condensation of $\alpha,\beta$-olefinic unsaturated dicarboxylic acid and divalent glycol. For this synthesis, use may additionally be made of saturated dicarboxylic acids, aromatic dicarboxylic acids or dicyclopentadiene which reacts with carboxylic acids. Examples of $\alpha,\beta$-olefinic unsaturated dicarboxylic acid include maleic acid, fumaric acid, itaconic acid, citraconic acid and anhydrides of these dicarboxylic acids. Examples of dicarboxylic acid which may be used together with such an $\alpha,\beta$-olefinic unsaturated dicarboxylic acid include adipic acid, sebacic acid, succinic acid, gluconic acid, phthalic anhydrides, o-phthalic acid, isophthalic acid, terephthalic acid, tetrahydrophthalic acid and tetrachlorophthalic acid. Examples of divalent glycol include alkanediol, oxaalkanediol and diols obtained by adding ethylene oxide and propylene oxide to bisphenol-A. Use may additionally be made of monools and trivalent triols. Examples of alkanediol include ethylene glycol, 1,2-propylene glycol, 1,3-propylene glycol, 1,3-butanediol, 1,4-butanediol, neopentyl glycol, 1,5-pentanediol, 1,6- hexanediol and cyclohexanediol. Examples of oxaalkanediol include dioxyethyleneglycol and trioxyethyleneglycol. Examples of monovalent or trivalent alcohol which may be used together with such glycols include octyl alcohol, oleyl alcohol and trimethylolpropane.

Synthesis of unsaturated polyester is usually carried out with heating, and the reaction is continued while by-product water is removed. Unsaturated polyesters with average molecular weight of 800–4000 and acid value of 20–60 are generally used according to the present invention. The vinyl monomers to be used in connection with the present invention are monovinyl monomers, including aromatic monovinyl monomers such as styrene, p-chlorostyrene and vinyl toluene and acrylic monovinyl monomers such as acrylic acid, methyl acrylate, methacrylic acid, methyl methacrylate and acrylonitrile. These vinyl monomers are usually compounded with the aforementioned unsaturated polyesters and the thermoplastic resins to be described below as their diluent.

BHT (ditertiary butylhydroxytoluene or 2,6-ditertiary butyl-4-methylphenol) for industrial use or for addition to foods may be used in the present invention. Between the room temperature (25° C.) and the curing temperature of SMC (40° C.), BHT has a very strong supplementing action on radicals which are generated in small amounts from organic peroxides added as a polymerization initiator, thereby significantly improving the stability in storage of SMC. In the range of the molding temperature of SMC (120°–160° C.), on the other hand, BHT has very weak supplementing action, causing no delay in the curing reaction and having no ill-effects on surface smoothness. Examples of compound with effect of inhibiting polymerization at temperatures over 100° C. include quinones such as p-benzoquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone and 2,5-diacyloxy-p-benzoquinone, and hydroquinones such as hydroquinone, p-t-butylcatechol, 2,5-t-butylhydroquinone, mono-t-butylhydroquinone and 2,5-di-t-amylhydroquinone, which are known polymerization inhibitors. Of the above, PBQ is particularly preferable. They are to be used at the rate of 0.001–0.1 weight parts, and more preferably 0.005–0.05 weight parts, against the total of 100 weight parts for unsaturated polyester, vinyl monomers, BHT and thermoplastic resin.

Thermoplastic resins which are commonly used as low shrink additives for unsaturated polyesters may be used for the purpose of the present invention. Examples of such thermoplastic resins include polybutadienes and their hydrogen adducts, polyisoprenes and their hydrogen adducts, aromatic vinyl-conjugate diene block copolymers and their hydrogen adducts, polystyrene, styrene-vinyl acetate block copolymers, polyvinyl acetate and polymethyl methacrylates. Additionally, saturated polyesters (with molecular weight 300–100,000) and polyethers may also be considered. Of the above, aromatic vinyl-conjugate diene block copolymers, polyvinyl acetate, polymethyl methacrylates and saturated polyesters are preferable, and aromatic vinyl-conjugate diene block polymers and polyvinyl acetate are particularly preferred.

Aromatic vinyl-conjugate diene block copolymers are themselves block copolymers of a known kind, and can be synthesized by a known block copolymerization method from an aromatic vinyl monomer such as styrene, chlorostyrene and vinyl toluene and a conjugate diene monomer such as butadiene and isoprene. Examples of such block copolymers include styrene-isoprene block copolymer. Of such block copolymers, those with molar ratio of aromatic vinyl monomer to conjugate diene monomer in the range of 50:50–5:95 and average molecular weight in the range of about 3000–200,000 are preferred.

Thermoplastic resins to be used in the present invention may be obtained by carboxyl modification of polymers described above. Polymers with a carboxylic group introduced thereto can improve not only compatibility with unsaturated polyester resins but also thickening speed of the compound by the action of magnesium oxide when SMC and BMC are prepared.

Unsaturated polyester compositions of the present invention can provide superior stability in storage and high surface quality if unsaturated polyester, vinyl monomer, BHT, thermoplastic resin and a compound with effect of inhibiting polymerization at temperatures over 100° C., as explained above, are contained at ratios within a specified range, that is, 20–40 weight parts or preferably 25–35 weight parts of unsaturated polyesters, 20–60 weight parts or preferably 30–50 weight parts of vinyl monomer, 0.01–1.0 weight parts or preferably 0.08–0.5 weight parts of BHT, 10–40 weight parts or preferably 15–30 weight parts of thermoplastic resin such that the total will be 100 weight parts, and 0.001–0.1 weight parts or preferably 0.005–0.05 weight parts against this total of 100 weight parts of compound with effect of inhibiting polymerization at temperatures over 100° C. If the ratios of combination are not within these ranges, stability in storage and high surface quality cannot be attained. If less than 0.01 weight part of BHT or less than 0.001 weight part of compound with effects of inhibiting polymerization at temperatures over 100° C. is contained, in particular, stability in storage of the unsaturated polyester composition becomes insufficient. If more than 1.0 weight part of BHT or more than 0.1 weight part of compound with effects of inhibiting polymerization at temperatures over 100° C. is contained, on the other hand, the curing speed is adversely affected, crosslinking becomes insufficient and quick curing and surface quality properties are not attained.

As an initiator for the present invention, at least one organic peroxide is selected from tertiary butyl peroxybenzoate (TBPB), tertiary butyl peroxyoctoate (TBPO), 2,5-dimethyl-2,5-di(benzoyl peroxy)cyclohexane (DDBPH), tertiary amyl peroxyoctoate (TAPO) and tertiary butyl isopropyl carbonate (TBIPC) according to the desired curing speed. These initiators are used at a ratio of 0.5–5 weight parts or preferably 1.0–3.0 weight parts against the total of 100 weight parts for unsaturated polyesters, vinyl monomer, BHT and thermoplastic resin.

In addition to the reaction initiators mentioned above, it is preferable to use a curing accelerator according to the present invention. Examples of curing accelerator include organic compounds of metals such as cobalt, copper and manganese, their octoates, naphthenates and acetylacetonates. They may be used either singly or in combination. These organic metal compounds are used at the rate of 10–1000 ppm as metal with respect to unsaturated polyester composition.

In order to improve the surface quality of quickly curable SMC, it is also preferable according to the present invention to use alkanepolyol polymethacrylates or alkanepolyol polyacrylates such as dimethacrylates and diacrylates of alkanepolyols having 2-12 carbon atoms such as ethylene glycol dimethacrylate, diethylene glycol dimethacrylate, triethylene glycol dimethacrylate, propylene glycol dimethacrylate, dipropylene glycol dimethacrylate, 1,4-butanediol dimethacrylate, neopentyl glycol dimethacrylate, 1,6-hexanediol dimethacrylate, ethylene glycol diacrylate, 1,3-propanediol diacrylate, 1,4-butanediol diacrylate, neopentyl glycol diacrylate, 1,6-hexanediol diacrylate, trimethylolpropane dimethacrylate, glycerine dimethacrylate, pentaerythritol dimethacrylate and trimethylolpropane diacrylate.

Further examples include polymethacrylates and polyacrylates of alkanepolyols having 3-12 carbon atoms such as trimethylolpropane trimethacrylate, glycerine trimethacrylate, pentaerythritol trimethacrylate, glycerine triacrylate, pentaerythritol triacrylate, pentaerythritol tetramethacrylate, dipentaerythritol hexamethacrylate, pentaerythritol tetraacrylate and dipentaerythritol hexacrylate. These alkanepolyol polymethacrylates and alkanepolyol acrylates are believed to improve elasticity of the resin component at the time of molding, contributing to the surface hardness and smoothness of the molded products. They are added at the rate of 1-15 weight parts or preferably 3-10 weight parts with respect to 100 weight parts of unsaturated polyester composition.

Whenever necessary, fillers, pigments and thickeners may be added to the unsaturated polyester compositions of the present invention. Examples of a filler include calcium carbonate, talc, silica, clay, glass powder and glass balloons. Examples of pigment include titanium oxide, carbon black, iron oxide red and phthalocyanine blue. Examples of a thickener include oxides and hydroxides of magnesium and calcium. Molding materials for sheet-like SMC and bulk-like BMC can be obtained from unsaturated polyester compositions containing various such additives by using known apparatus and method to impregnate glass fibers (for example, of diameter about 8-20μ and length ½-4 inches) therewith. Glass fibers are usually used at the ratio of 10-40 weight % with respect to the unsaturated polyester composition. Molding materials of the present invention may be heated and compression-molded in a mold (at pressure 50-120 kgf/cm$^2$ and temperature 110°-180° C.) to produce molded products.

Experimental Results

Sheet molding compounds (SMCs) were prepared with compositions shown in Tables 1 and 2, and each was compressed under specified conditions with flow time of 9 seconds and pressure 80 kgf/cm$^2$ to produce a molded product in the shape of a plate (with dimensions 500×1000×2 mm) as shown in FIG. 1. Comparison Examples (Comp. Expl.) 1-5 are products from compositions not containing BHT or a compound with effect of inhibiting polymerization at temperatures over 100° C., which are indispensable components according to the present invention. Curing characteristics and stability in storage of these prepared SMCs, as well as surface characteristics and hardness of molded products therefrom, were measured. The results of such measurements are also shown in Tables 1 and 2.

Stability in storage is expressed by the number of days for which each SMC could remain fluid so as to be able to be molded into the shape shown in FIG. 1 while the ambient temperature remained 23° C. The surface characteristics of molded products were measured by using a three-dimensional tester (Microcord FJ604 produced by Mitsutoyo, Inc.). Surface measurements (X, Y, Z) were taken first along Lines 1-4 of FIG. 1 at 300 points at pitch of 1.0 mm. Fifth-order regression curves were calculated from the Z-values of the individual points to determine the cross-sectional shape, and the average deviations of the individual Z-values from the curves were obtained. Surface roughness was measured from Line 5 of FIG. 1.

TABLE 1

|  | Test Expl. 1 | Test Expl. 2 | Test Expl. 3 | Comp. Expl. 1 | Test Expl. 4 | Test Expl. 5 | Test Expl. 6 | Test Expl. 7 |
|---|---|---|---|---|---|---|---|---|
| 1) Composition |  |  |  |  |  |  |  |  |
| A-1 | 30 | — | 30 | 30 | 30 | 30 | 30 | 30 |
| A-2 | — | 30 | — | — | — | — | — | — |
| B | 50 | 50 | 50 | 50 | 50 | 50 | 50 | 50 |
| C | 0.05 | 0.05 | 0.05 | 0.05 | 0.05 | 0.05 | 0.05 | 0.05 |
| D-1 | 15 | 15 | — | 15 | 15 | 15 | 15 | 15 |
| D-2 | — | — | 15 | — | — | — | — | — |
| E-1 | 1.0 | 1.0 | 1.0 | 1.0 | 1.0 | 0.5 | 1.5 | — |
| E-2 | — | — | — | — | — | — | — | 2.0 |
| E-3 | — | — | — | — | — | — | — | — |
| F | 0.05 | 0.05 | 0.05 | 0.05 | 0.05 | 0.05 | 0.05 | 0.05 |
| G | 0.01 | 0.01 | 0.01 | — | 0.01 | 0.01 | 0.01 | 0.01 |
| H | 5.0 | 5.0 | 5.0 | 5.0 | 5.0 | 5.0 | 5.0 | 5.0 |
| I | 180 | 180 | 180 | 180 | 180 | 180 | 180 | 180 |
| J | 4.0 | 4.0 | 4.0 | 4.0 | 4.0 | 4.0 | 4.0 | 4.0 |
| K | 1.0 | 1.0 | 1.0 | 1.0 | 1.0 | 1.0 | 1.0 | 1.0 |
| L | 110 | 110 | 110 | 110 | 110 | 110 | 110 | 110 |
| 2) Curing characteristics |  |  |  |  |  |  |  |  |
| 2)-1 | 30/36 | 30/37 | 31/37 | 27/33 | 32/39 | 33/41 | 25/31 | 39/47 |
| 2)-2 | 6 | 7 | 6 | 6 | 7 | 8 | 6 | 8 |
| 3) Stability in storage | 40 | 39 | 40 | 24 | 48 | 53 | 37 | 47 |
| 4) Surface Characteristics |  |  |  |  |  |  |  |  |
| 4)-1 | 2.5 | 2.8 | 2.4 | 8.4 | 2.7 | 6.6 | 2.2 | 2.6 |
| 4)-2 | 1.0 | 1.3 | 1.1 | 3.2 | 1.1 | 0.9 | 1.1 | 1.5 |
| 5) Hardness | 79 | 77 | 79 | 78 | 79 | 77 | 77 | 76 |

TABLE 2

|  | Test Expl. 8 | Test Expl. 9 | Test Expl. 10 | Test. Expl. 11 | Comp. Expl. 2 | Comp. Expl. 3 | Comp. Expl. 4 | Comp. Expl. 5 |
|---|---|---|---|---|---|---|---|---|
| 1) Composition |  |  |  |  |  |  |  |  |
| A-1 | 30 | 30 | 30 | 30 | 30 | 30 | 30 | 30 |
| A-2 | — | — | — | — | — | — | — | — |
| B | 50 | 50 | 50 | 50 | 50 | 50 | 50 | 50 |
| C | 0.05 | 0.05 | 0.05 | 0.05 | — | — | — | — |
| D-1 | 15 | 15 | 15 | 15 | 15 | 15 | 15 | 15 |
| D-2 | — | — | — | — | — | — | — | — |
| E-1 | — | 0.3 | 0.3 | 1.0 | 1.0 | — | — | 1.0 |
| E-2 | — | 2.0 | 1.0 | — | — | 2.0 | — | — |
| E-3 | 2.0 | — | 0.2 | — | — | — | 2.0 | — |
| F | 0.05 | 0.05 | 0.05 | — | 0.05 | 0.05 | 0.05 | 0.05 |
| G | 0.01 | 0.01 | 0.01 | 0.01 | 0.01 | 0.01 | 0.01 | 0.01 |
| H | 5.0 | 5.0 | 5.0 | 5.0 | 5.0 | 5.0 | 5.0 | 5.0 |
| I | 180 | 180 | 180 | 180 | 180 | 180 | 180 | 180 |
| J | 4.0 | 4.0 | 4.0 | 4.0 | 4.0 | 4.0 | 4.0 | 4.0 |
| K | 1.0 | 1.0 | 1.0 | 1.0 | 1.0 | 1.0 | 1.0 | 1.0 |
| L | 110 | 110 | 110 | 110 | 110 | 110 | 110 | 110 |
| 2) Curing characteristics |  |  |  |  |  |  |  |  |
| 2)-1 | 46/54 | 30/38 | 45/58 | 33/42 | 30/36 | 39/47 | 46/54 | 38/53 |
| 2)-2 | 8 | 8 | 13 | 9 | 6 | 8 | 8 | 15 |
| 3) Stability in storage | 55 | 43 | 58 | 44 | 15 | 20 | 25 | 33 |
| 4) Surface Characteristics |  |  |  |  |  |  |  |  |
| 4)-1 | 2.5 | 2.6 | 2.7 | 2.5 | 2.8 | 3.1 | 2.5 | 12.5 |
| 4)-2 | 1.4 | 1.2 | 1.3 | 1.1 | 1.3 | 1.5 | 1.4 | 4.2 |
| 5) Hardness | 76 | 78 | 79 | 78 | 77 | 76 | 77 | 63 |

In Tables 1 and 2:

A-1: Unsaturated polyester synthesized from propylene glycol and maleic acid, containing styrene by 30%; viscosity at 25° C.=820 cps; acid value=16.5. Numbers indicate weight parts of unsaturated polyester alone, the weight parts of styrene being not included.

A-2: Unsaturated polyester synthesized from 0.9 mole of propylene glycol, 0.3 mole of dicyclopentadiene and 1.0 mole of maleic anhydride containing styrene by 35%; viscosity at 25° C.=650 cps; acid value=21. Numbers indicate weight parts of unsaturated polyester alone, the weight parts of styrene being not included.

B: Styrene. Numbers indicate weight part inclusive of styrene used as diluent to unsaturated polyester and styrene/butadiene copolymer.

C: BHT.

D-1: Styrene/butadiene copolymer with average molecular weight 120000, containing 15 weight % of styrene and 85 weight % of butadiene and having 0.5 weight % of carboxylic groups. That which was used contained 30 weight parts of this copolymer and 70 weight parts of styrene, having viscosity of 28000 cps at 25° C. Numbers indicate the weight parts of styrene/butadiene copolymer alone, the weight parts of styrene being not included.

D-2: Polyvinyl acetate

E-1: t-butyl peroxyoctoate

E-2: t-butyl peroxybenzoate

E-3: 2,5-dimethyl-2,5-di(benzoyl peroxy)hexane

F: Cobalt acetyl acetonate

G: p-benzoquinone

H: Trimethylolpropane trimethacrylate

I: Calcium carbonate

J: Zinc stearate

K: Magnesium oxide

L: Glass fibers (diameter=13μ; length=1 inch)

Curing characteristics: Curing characteristics of SMC (by exothermic method; 140° C.)

2)-1: Gelation time/Cure time (seconds)

2)-2: ΔT(=(Cure time)—(Gelation time))

Stability in storage: Stability of SMC in storage (day)

Surface characteristics: Surface characteristics of molded products

4)-1: Average deviation from fifth regression curve (μ)

4)-2: Surface roughness (μ)

Hardness: Hardness of molded product (Rockwell hardness; M-scale)

Unsaturated polyester compositions of the present invention, as well as molding materials obtained by impregnating glass fibers therewith, not only are quickly curable and hence high in productivity but also have superior workability at the time of curing. Moreover, molded products therefrom have extremely high surface smoothness and hence can be extremely useful for use, for example, for automotive exterior body panels. Since they have very good stability in storage, the unsaturated polyester compositions, curing characteristics of the molding materials and the surface smoothness of the molded products therefrom do not change even after a storage for a long period of time. In summary, the present invention provides molding materials which are extremely convenient to use.

What is claimed is:

1. An unsaturated polyester composition comprising unsaturated polyester, vinyl monomer, BHT (ditertiary butyl hydroxy toluene), thermoplastic resin, at least one kind of organic peroxide serving as reaction initiator and p-benzoquinone, said composition containing 20–40 weight parts of unsaturated polyester, 20–60 weight parts of vinyl monomer, 0.01–1.0 weight parts of BHT (ditertiary butyl hydroxy toluene), and 10–40 weight parts of thermoplastic resin such that the total is 100 weight parts, said composition containing 0.001–0.1 weight parts of p-benzoquinone against said total of 100 weight parts.

2. The unsaturated polyester composition of claim 1 having molecular weight 800–4000 and acid value 20–60.

3. The unsaturated polyester composition of claim 1 containing 0.005–0.05 weight parts p-benzoquinone against said total of 100 weight parts.

4. The unsaturated polyester composition of claim 1 wherein said thermoplastic resin is selected from the group consisting of aromatic vinyl-conjugate diene block copolymers, polyvinyl acetate, polymethyl methacrylates and saturated polyesters.

5. The unsaturated polyester composition of claim 1 further containing one selected from the group consisting of alkanepolyol polymethacrylates and alkanepolyol polyacrylates.

6. A molding material obtained by impregnating the unsaturated polyester composition of claim 1 in glass fibers.

7. A molded product obtained by curing the molding material of claim 6.

* * * * *